Jan. 1, 1963  J. M. BLANCHARD  3,071,145
SONIC AND ULTRASONIC VIBRATION GENERATORS
Filed Dec. 1, 1958  4 Sheets-Sheet 2

INVENTOR
JEAN M. BLANCHARD
By Bailey, Stephens & Huettig
ATTORNEYS

Jan. 1, 1963     J. M. BLANCHARD     3,071,145
SONIC AND ULTRASONIC VIBRATION GENERATORS
Filed Dec. 1, 1958     4 Sheets-Sheet 3

INVENTOR
JEAN M. BLANCHARD
By Bailey, Stephens v Huettig
ATTORNEYS

Jan. 1, 1963  J. M. BLANCHARD  3,071,145
SONIC AND ULTRASONIC VIBRATION GENERATORS
Filed Dec. 1, 1958  4 Sheets-Sheet 4

INVENTOR
JEAN M. BLANCHARD
By Bailey, Stephens & Huettig
ATTORNEYS

United States Patent Office 3,071,145
Patented Jan. 1, 1963

3,071,145
SONIC AND ULTRASONIC VIBRATION GENERATORS
Jean Maurice Blanchard, Lisbon, Portugal, assignor, by mesne assignments, to Sirius, Grand Duchy of Luxembourg, a corporation of Luxembourg
Filed Dec. 1, 1958, Ser. No. 777,523
Claims priority, application France Dec. 3, 1957
16 Claims. (Cl. 134—122)

This invention relates to sonic and ultrasonic vibration generators, and its general object is to provide improvements in the construction of such generators.

In sonic and ultrasonic vibration generators, pulsed jets of fluid, of either liquid or gaseous character, having a pulse frequency or rate of desired value, are generally used to generate the vibrations. The pulses may be produced by mechanical means, such as vibratory strips or reeds, perforate discs or cylinders, etc., which act intermittently to open and seal orifices through which the fluid is directed under pressure, so that a fluid output is produced which is chopped or pulsed at the desired frequency. In another class of such generators, the pulses may be produced by various expedients involving a reaction of the fluid stream against its own mass for which purpose the fluid may be guided over a closed-loop path and/or is made to reflect against suitably arranged obstacles.

The first class of generators just mentioned include various wind-instruments and siren-type generators. The second above mentioned class includes certain other musical wind-instruments, and the so-called whistle-type generators.

This invention is more particularly concerned with generators and/or instruments of the second class just defined. Such instruments or devices are frequently constructed in the form of volumes of revolution of more or less straight or spiral form.

As the point of impact between a "direct" jet of fluid which is entering the cavity of such a device, with another portion of the fluid jet which has already described a path of more or less great extent within the cavity of the same volume, the incident fluid is intercepted thereby momentarily cutting off the supply of said incident fluid into the cavity. Owing to this interruption in supply the incoming fluid is no longer intercepted and is allowed to advance into the circuit through the cavity. This constitutes one repetitive vibratory cycle.

The vibrational frequency is a function, in particular, of the time required by the fluid to travel through the circuit, and may be defined as the ratio:

$$\text{Frequency} = \frac{\text{Circuit perimeter}}{\text{Fluid flow rate}}$$

However, the amount of acoustic power generated by generators of the whistle type is limited by their dimensions, and these in turn depend directly on the vibrational frequency to be produced. In many industrial applications it would be desirable to generate larger vibrational energies than those allowed by the frequencies required.

If it is attempted to increase the dimensions of generators of conventional construction, various objectionable parasitic effects set in.

Thus, conventional generators have usually been comprised of metallic masses. While it has been found possible to produce sonic and ultrasonic vibrations in such generators readily enough when the generator dimensions are small, an increase in size results in the following consequences:

First, the vibrations are transmitted through the metal, thereby creating parasitic interference effects between the vibrations successively occurring in each of the elementary portions into which the metal mass of the generator can be theoretically subdivided.

Secondly, since a machined metal mass cannot generally be made to comprise a plurality of accurately identical portions, there is a lack of synchronism as between the vibratory effects occurring in each portion.

This dissimilarity between the portions of the metal mass may be due either to manufacturing tolerances and/or to subsequent distortion of the metal under the stress of the circulating fluid in the cavity or cavities in said mass.

It is an important object of the invention to provide an improved construction of sonic and ultrasonic generators of the whistle type, especially in regard to the ease of manufacture of such generators, accuracy in the vibration frequencies attained, increased power of the vibrations generated, and the service life thereof.

In accordance with an aspect of the invention, a sonic and/or ultrasonic generator of the whistle type is characterized in that it comprises at least one laminated assembly of sheets, strips or other laminae, stacked in one or more selected directions, some at least of said laminae being formed with cutouts or recesses defining a suitable vibration-generating path for the fluid.

Further features of the invention, which may be taken singly or in combination as may be required, include the following:

Two or more similar or identical cutout portions are provided in each of which a portion of the fluid is adapted to vibrate;

Some at least of the cutout portions in the laminae communicate with a cutout element of the same laminae, which element is common to all the cutout portions under consideration;

The generator comprises a plurality of stacks of laminae which stacks are separated from one another and may desirably be distributed in a radial pattern about a geometric axis;

The generator mainly comprises a single assembly of stacked laminae, which assembly however may include laminae of more than one different type;

A plurality of the laminae or strips from which the generator is formed comprises a single type and are directly stacked in contiguous relation to one another, the resulting stack defining a volume including cavities the elementary portions of which are constituted by the combination of the inner cutouts formed in the laminae;

A plurality of laminae or strips of a common type from which the generator is made, which laminae are hereinafter termed "active" laminae or strips, are stacked in systematically alternating relation with insert laminae or strips which together form a set of laminae which are formed with cutouts defining a fluid passage in a plane normal to the midplane of such strips, while preventing a vibration-generating flow of the fluid in said midplane, as is the case for said active strips.

In one specific application or embodiment of a generator according to the invention, the generator is applied for the purpose of cleaning or de-greasing wires, strips or the like, and for this purpose there is provided a means for passing such wires or the like to be degreased through some at least of the channels or the like defined by the combined cutouts in the laminae, and at least one vibration-generating fluid is used which is in the nature of a degreasing fluid, which may desirably be vaporized.

Preferably the laminae or strips are cut out by some suitable process which will ensure a close degree of uniformity between them, such as punching or die-pressing, or spark-machining techniques.

Preferably also, the stacked strips are clamped together between a pair of rigid end flanges, with intermediate flanges being provided if desired. The end flanges are fitted with fluid inlet and outlet connections.

To promote a uniform supply of fluid to the various components of the generator device, there is preferably provided a common casing or enclosure serving as a supply or inlet manifold for all the elements.

A clear understanding of the invention will be had from a perusal of the ensuing description made with reference to the accompanying drawings, wherein.

It will be understood of course that the drawing and associated description are given primarily by way of illustration of the invention but cannot be regarded as defining the scope thereof.

Figure 1:
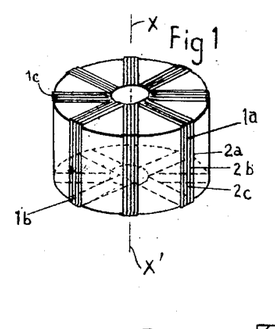
FIG. 1 is a highly simplified perspective view of a vibration generating device according to one embodiment of the invention, and comprising a plurality of separate stacks of laminae or strips disposed in a star or radial pattern along the diagonals of a regular polygon; the cutouts in the strips being omitted from the showing.

A sonic or ultrasonic vibration generating unit or device as schematically illustrated in FIG. 1, comprises a plurality of elementary stacks 1a, 1b, 1c &c., each comprising strips or laminae 2a, 2b, 2c, &c., which are formed with internal cutouts, and all such component stacks are disposed in a radial or star-like pattern about an axis XX' which is the center axis of a cylindrical volume defined by the plurality of stacks. The different stacks are formed so that inner cavities are defined therein which cavities are limited by lateral closing plates, strips, laminae or the like provided on both sides of said stacks. Ducts are provided for giving access to said cavities.

Figure 2:
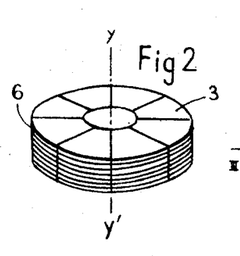
FIG. 2 is a similar view of a vibration generator according to another embodiment of the invention, and comprising a single stack of strips.

A sonic or ultrasonic vibration generating unit or device as schematically illustrated in FIG. 2, on the other hand, comprises a single stack of disc-shaped laminae 3 forming a cylindrical body having an axis YY' normal to the planes of the laminae. The individual laminae are likewise internally cut out in a manner to be later specified.

It should be understood that while the diagrams of FIGS. 1 and 2 are intended to illustrate two possible arrangements according to which the stacked laminae or strips may be disposed in a generator according to the invention, various other suitable arrangements may be conceived within the scope of the invention.

Vibration generators according to the invention may, inter alia, be made up of laminae or strips of substantially square, rectangular or polygonal contour, or of circular oblong or rounded contour, and may include any of various irregularities in their peripheral contour. Also the configurations of the internal cutout or cutouts in the strips may differ depending on the individual characteristics of each unit.

Figure 3:
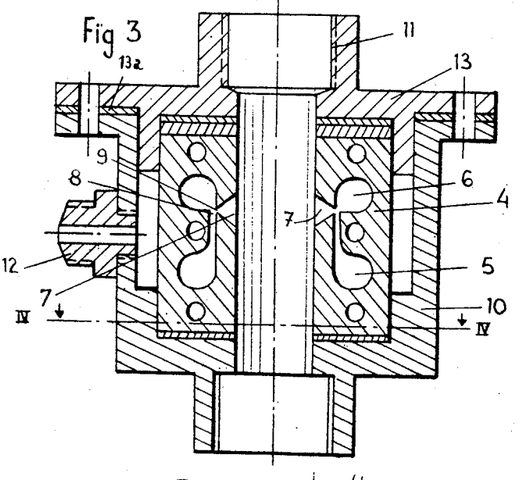
FIG. 3 is a more detailed view on the line III—III of FIG. 4, of a generator according to the embodiment of the invention diagrammatically depicted in FIG. 1, and this view shows two representative strips of the stack with the cutouts therein.

Thus, a lamina or strip of the type shown at 4 in FIG. 3, is preferably provided in a vibration generator wherein the strips are all disposed radially, in planes parallel to the axis of the generator. With such a strip 4, the fluid enters the cutout portion or cavity 5, through the aforesaid ducts and describes a circuitous path comprising such cavity 5 and the cutout portion or cavity 6. Said cavities herein are each defined by circumferential arcs of substantially 270°, and are interconnected by a duct or channel. The fluid path following said cavities comprises a deflection chamber 7. The impact between incoming fluid and reflected fluid occurs at a point determined by the positions of the slots 8 and 9. The slot 8 constitutes a restriction which provides communication between the two cavities 5 and 6, while slot 9 similarly constitutes a restriction providing communication between the deflection chamber 7 and the space, in the form of a complex volume of revolution, defined by the cavities 5 and 6 in all the stacked strips, said volume being limited by lateral strips or laminae constituting closing plates for the cavities defined by cutout portions 5—6—7—8 and 9. Depending on the fluid pressure of the incoming fluid supplied to the circuit comprising the cutouts 5—6—7 (it being recalled that the vibration frequency is a function of the time taken by the fluid to describe circuit), sonic or ultrasonic vibrations of a predetermined frequency will be generated.

FIG. 3 further illustrates in section a common casing 10 surrounding the laminae in a vibration generator according to the invention. The casing is formed at one end with a screw threaded end opening 11 adapted for connection with a fluid supply conduit, and in a side thereof with a connection 12. The casing is in two parts or sections, including the cover section 13 assembled to a body section 10 by way of an interposed seal 13a.

The internally cutout strips are preferably punched (or press-formed or spark-cut) out of stainless steel, e.g. 0.5 mm. thick; aluminum alloy stock may also be used.

Figure 4:
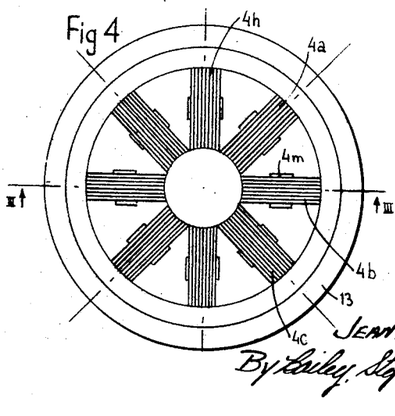
FIG. 4 is a section on line IV—IV of FIG. 3.

FIG. 4 illustrates eight stacked assemblies 4a, 4b, 4c to 4h, each comprising a stack of strips which may be similar to the strips 4 in FIG. 3. In each stack the individual strips are held in assembled relation by means of a clamp 4m.

Figure 5:
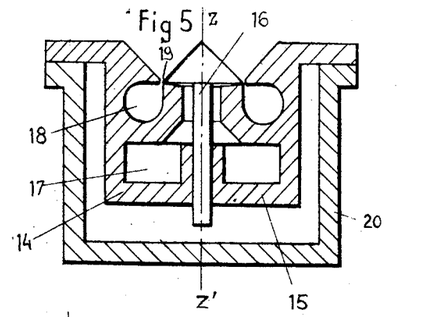
FIG. 5 is similar to FIG. 3 and relates to a form of embodiment of the invention which may be similar to that shown in that figure, and including strips wherein the cutouts may be formed as those in FIG. 3.

A vibration generator unit according to the showing of FIG. 5 comprises a stack of double strips such as 14—15 each symmetrical about an axis Z—Z' constituting the center axis of a central tie-bolt or spindle 16 serving to assemble the device. The sheets or strips such as 14—15 may either be stacked radially to provide generally cylindrical generators as in FIGS. 1 and 4, or they may be stacked linearly thereby yielding large-size, high-power generators.

In strips of the kind shown at 14 and 15, the fluid enters by way of a chamber 17, and describes a circuitous path from the chamber 17 into and around the cavity 18, whence it is let out of the unit at 19, which provides the point of impact between the incoming and reflected fluid portions. 20 designates the common casing surrounding the symmetrical strips 14—15.

The laminae or strips in a generator according to the invention may be assembled in various ways, e.g. bonded with adhesive resin of sufficient viscosity to oppose the transfer of vibrations of sonic and ultrasonic frequencies from each lamina to an adjacent one. Resins of the kind sold under the trade name Ardalite have been found especially suitable. The bonded assembly may be supplemented by mechanical connecting means such as tie-rods or bolts.

Vibration generators according to the invention may comprise laminae formed with internal cutouts especially devised for the purpose of constructing certain special types of apparatus or instruments, such as devices of the so-called Galton whistle type, which is based on the operating principle of the flute. Or they may be constructed in accordance with the Hartmann type of whistle. The invention will in such cases provide very substantial improvements in the operation of these conventional types over what was obtainable with such devices of the prior art, especially due to the great reduction in parasitic vibratory effects.

Figure 10:
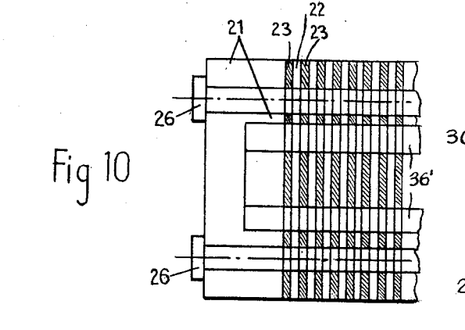
FIG. 10 is a schematic view in longitudinal section of a stack according to the invention.

The device shown fragmentarily and in simplified form in FIG. 10 comprises a linear stack of rectangular strips stacked in a direction normal to the general axis of the generator unit. The stack is clamped between two end flanges, only one, 21, of which is shown in the figure. In this embodiment the strips comprising the stack are of two different types, namely so-termed "active" strips of the kind shown in FIG. 6 and designated generally as 22 herein, and so-called "insert" strips of the kind shown in FIG. 8.

An active strip 22 (in FIG. 6) is desirably made from a material showing high resistance to any conditions encountered in service, e.g. stainless steel or the material known by the trade name "Hostaflon." The strip may generally be 1 to 2 mm. thick. Each such strip is formed with a plurality of cutouts providing a number of rosette patterns two of which are shown stippled for clarity in FIG. 6. One rosette pattern is shown to an enlarged scale in FIG. 7. With reference to that figure the fluid entering by way of any one of the cutout portions 28a, 28b, 28c, 28d flows into another portion 30a, 30b, 30c 30d. A duct 29 connects the respective cutout portions in pairs. The duct has convergingly tapered walls leading to a slot such as 31 whereby it connects with the cutout portions 30a, 30b, 30c or 30d. The general path of fluid flow in such a cutout pattern is effected as indicated by the successive arrows F1—F2—F3 in connection with the cutout portions 28a—30a. The partial paths of fluid flow interact at a point near the slot 31, and thereafter the fluid continues its flow-path by way of a slot 32 into a duct 32a having diverging sides which terminates at a central portion 33 of the rosette pattern. This central cutout portion 33 serves as an outlet collector or manifold for the vibrating fluid proceeding from the four side portions 28a—30a, 28b—30b, 28c—30c and 28d—30d for the rosette pattern.

Figure 7:
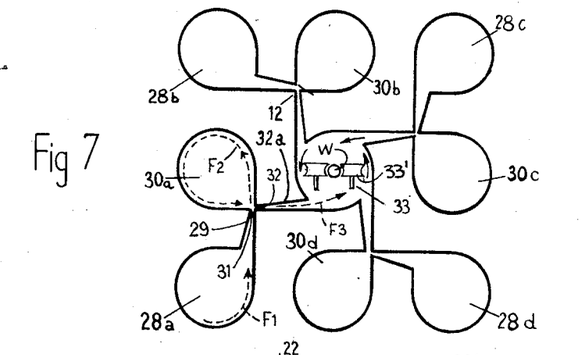
FIG. 7 is a more detailed view of a lamina according to FIG. 6, showing the "rosette" cutout pattern used therein on an enlarged scale.
Figure 17:
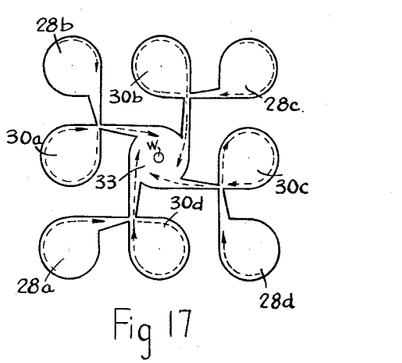
FIG. 17 is a view similar to FIG. 7 wherein the rosette pattern of FIG. 7 has been turned over bodily by a 180° rotation about an axis lying in its plane.

It will be noted that the rosette pattern of the cutouts has a center of symmetry but lacks an axis of symmetry. The fluid circulates through this rosette pattern in a certain well-defined sense which in the illustrated example of FIG. 7 is such as to lead to a counterclockwise circulation within the central cutout cavity 33. One result of this arrangement is, that if the rosette pattern is turned over bodily as by a 180° rotation about an axis lying in the plane of the figure 7, to obtain a pattern as shown in FIG. 17 the sense of fluid flow will be reversed in the corresponding portion of the stack of strips, including the central cutout cavity.

Each of the active strips 22 (FIG. 6) including the cutouts such as 24a—24b—24c—24d, etc., constitutes an elementary, multiple generator of sonic or ultrasonic vibrations.

Figure 8:
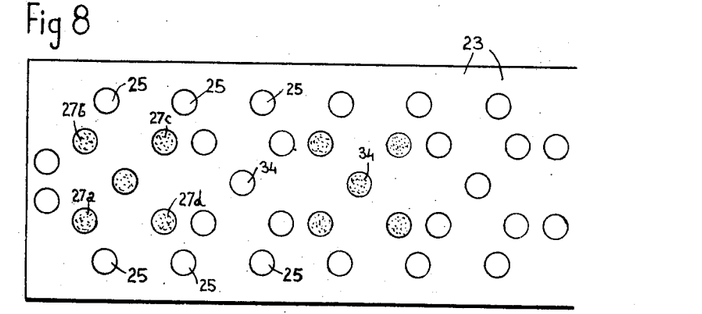
FIG. 8 is a plan view similar to FIG. 6 but relating to an insert strip in an embodiment of the invention which may be combined with that of FIG. 6.
Figure 9:
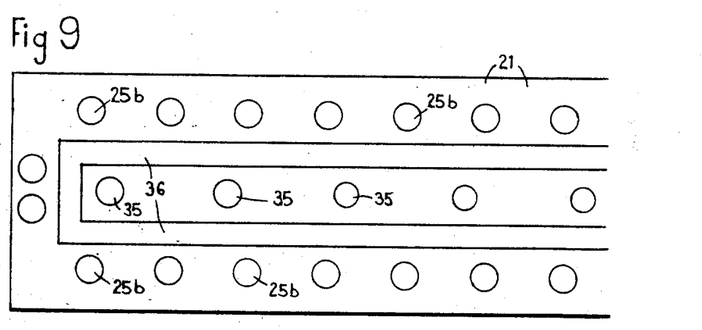
FIG. 9 is yet another similar view, in a corresponding embodiment, of an end flange serving to clamp an alternate stack of respective strips as in FIGS. 6 and 8.

In the corresponding construction of the generator apparatus, a general view of which is illustrated in FIG. 10, the stack of active strips 22 is made to alternate with insert strips a representative one of which is shown in FIG. 8 as 23. Such insert strip 23 is made of non corrodable material, e.g. polytetrafluorethylene, about 2 mm. thick. An insert strip 23 is formed with apertures 25 for the passage of tie-bolts serving to assemble the strips, registering apertures 25a being provided for this purpose in the active strips 22, and further registering apertures 25b in the end flanges 21 (FIG. 9). The insert strip 23 further includes apertures 27a—27b—27c—27d which correspond or register with the apertures 28a—28b—28c—28d in each of the rosette-like cutouts of the active strips 22. The apertures 27a—27b—27c—27d constitute inlets for the vibration-generating fluid through which said fluid passes into the corresponding cutout portions in the adjacent active strip 22. The registering apertures such as 28a in the active strips 22 and 27a in the insert strips 23 define within the assembled device a plurality of longitudinal fluid injection ducts extending normally to the plane of the figures 6 and 8.

The assembly further includes the end flanges 21 (FIG. 9) which are formed with grooves 36' arranged to register with the rows of the apertures such as 28a—28b—28c . . . 27a—27b—27c forming the stack of fluid injection ducts. The grooves 36 lead and distribute the vibration generating fluid into said ducts.

From each of the cavities 28a—28b—28c—28d constituting elements of said ducts, the fluid flows into a cavity or cutout portion 30a—30b—30c—30d of each rosette, as explained with reference to FIG. 7. The slots 31 are desirably bevelled and are provided with a width so predetermined as to achieve a high peripheral flow velocity for the fluid with regard to the viscosity thereof. The slots 32 are likewise bevelled and their width is similarly predetermined.

The central cutout cavities 33 (FIG. 7) together with the registering cavities 34 in the insert strips 23 and the cavities 35 in the end flanges 21 provide an outlet duct.

Vibration generating units of the kind described are capable of receiving a wide variety of applications. Thus they are applicable in connection with signal transmission and aircraft guidance, ultrasonic fog-eliminating systems in sintering processes, etc.

In this latter connection, i.e. for sintering operations, use is preferably made of generator apparatus comprising active strips cut out in rosette patterns with insert strips as described.

The stack is, moreover, preferably formed in such a manner that every other active strip is turned over or inverted in the manner mentioned above so as to increase considerably the vibrational agitation present in the outlet duct.

Using a vibration generator so assembled, if powder metal is introduced under substantial pressure, the powder metal will be alternately subjected in each succeeding strip to rotational forces of opposite sense, at an ultrasonic frequency. This induces high friction between adjacent particles of the metal powder material which is conductive to a fusing or sintering effect.

Another useful application of vibration generating apparatus according to the invention is to automobile carburettors.

A further application which will be more specifically described herein by way of example is to the de-greasing and cleaning of wire, metal strip and similar stock. For such use the generator strips are preferably formed with the rosette cutout patterns of the kind shown in FIG. 7. The stock, e.g.; wire to be treated, is passed by rolls 33' through the outlet duct 33 of the rosette stack, as indicated at w, normally to the plane of the drawing. The fluid from the cutout portions 30a—30b—30c—30d flows out through the outlet duct 33 in a pulsed condition which generates within the duct a correspondingly pulsed vertical flow. The fluid is selected as to its physical and chemical characteristics with regard to the particular operation to be effected. Thus, in case of a de-greasing process the fluid would be a solvent. The vibrations imparted by the fluid to the wire *w* effect a highly effective degreasing treatment. In this case also as previously mentioned in connection with the sintering process, the active strips are preferably alternately inverted as earlier described, in order further to enhance the efficiency of the degreasing process.

A vibration generating system embodying a unit according to the invention will normally comprise a pump for feeding fluid under pressure thereto. The pump discharge rate is predetermined with regard to the total discharge area from the generator device and the discharge velocity. The velocity in turn is a function of the velocity of the fluid and the surface characteristics of the conduit means. The total discharge flow area is predetermined with regard to the width of the fluid inlet and outlet slots 31 and 32 for each cutout portion such as 30*a*, as the product of unit slot width times number of discharge slots per strip times strip thickness times number of active strips in the stack.

A supply pressure of the order of 20 to 50 kg. per sq. cm. will usually be found sufficient, and slot width is desirably about 0.25 to 0.50 mm. Such slots are advantageously cut by means of a fine saw or by sparking. The slot walls may be subjected to a hardening treatment should this appear desirable in view of the nature of the fluid.

In order to avoid transmitting to the generator pulses inherent to the operation of the fluid injection pump, a screw type injection pump may be used, or alternatively an air bell may be interposed in the pump delivery line.

Figure 6:
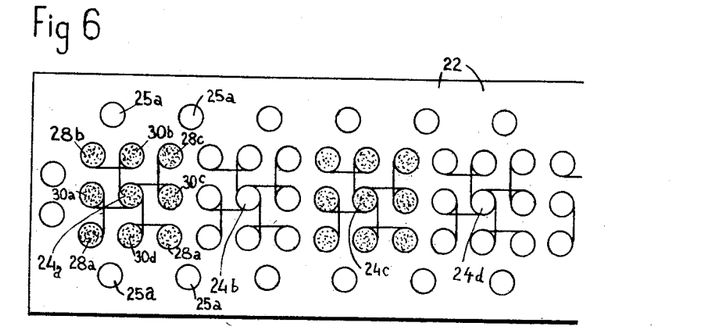
FIG. 6 is a diagrammatic plan view of a so-called active strip or lamina in another form of embodiment of the invention, capable of various applications.

A vibration generating system for degreasing wires may comprise e.g. twenty active strips of the rosette-cut-out type shown e.g. in FIG. 6, with twenty-one insert strips 23 of the type shown in FIG. 8.

A further interesting use of devices according to the invention is in connection with the mixing of fluids having widely differing density and/or viscosity values, each fluid being preliminarily dispersed. The fluids may include liquids, gases, and/or fluidized divided solids.

Figure 11:
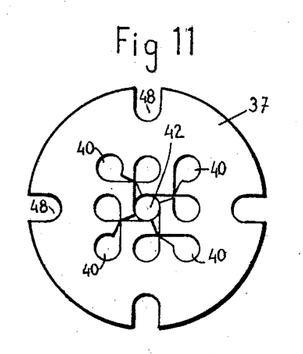
FIGS. 11 and 12 illustrate laminae or strips respectively corresponding to FIGS. 6 and 8, in a modified embodiment.

Another suitable form of apparatus comprises a stack of strips having internal rosette contoured cutouts, with the strips being disc-shaped as shown in FIG. 11. Each disc may comprise a single rosette pattern, and the entire unit may comprise one or more stacks of such discs, or each strip may have more than one rosette contour cut out in it.

Figure 12:
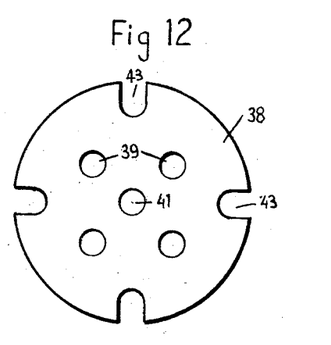
Figure 16:
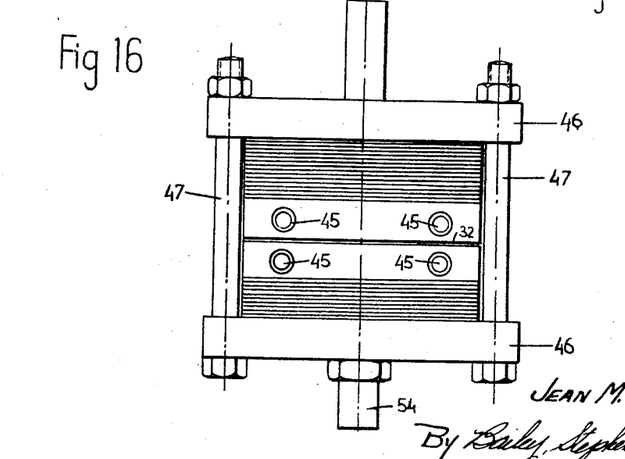
FIG. 16 is an outside elevational view of a vibration generating device constructed from disc-shaped laminae according to FIGS. 11 to 14.

Between each successive pair of active discs such as 37 in FIG. 11 is a generator according to the embodiment of the invention now described, and as illustrated in FIG. 16, there are interposed insert discs 38, see FIG. 12. The insert discs are formed with apertures 39 registering with the fluid injection apertures 40 which form part of the rosette contour cut out in the active discs 37. The orifices 39 and 40 in the stacked discs define the fluid injection inlet ducts into the device. The insert discs 38 are further each formed with a central aperture 41 registering with the fluid outlet orifices 42 in the active discs. The apertures 41 and 42 in the stacked discs define the fluid outlet duct. The discs 38 are further formed with apertures, notches or grooves such as 43 registering with similar recesses 48 formed in the active discs 37 for assembling the stack into a unitary vibration generator according to the invention.

Figure 13:
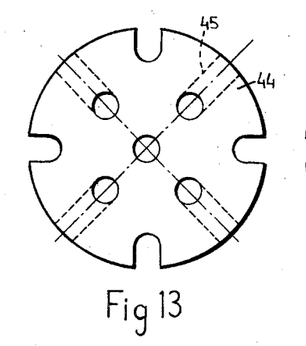
FIGS. 14 and 13 illustrate further auxiliary strips relating to further, cognate, modifications.

The stack including the active discs 37 and insert discs 38 further includes distributor discs 44 carrying fluid inlet connections 45 (see FIG. 13), equal in number to the number of different fluids to be mixed. The stack of discs 37, 38 and 44 is clamped between a pair of end flanges 46 (FIG. 16) interconnected by tie-bolts 47 extending through apertures 49 in the end flanges 46.

Guide rods may be used which respectively extend through the recesses 43 and 48 in the active insert discs, and through apertures 50 provided for the purpose in the end flanges 46.

The end flanges further include a central aperture 51 registering with the respective apertures 41 and 42 in the discs 38 and 37 which define the fluid outlet duct.

Figure 14:
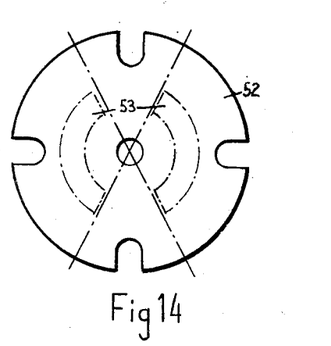
Figure 15:
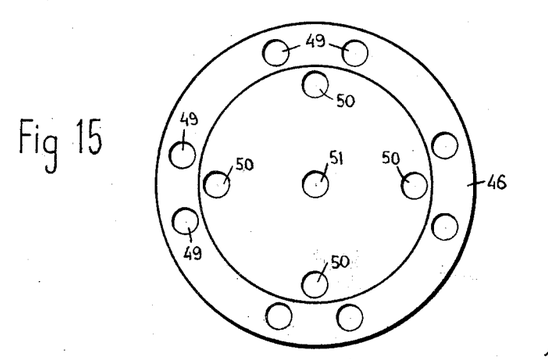
FIG. 15 is a plan view of an end flange for use with the strips of FIGS. 11 to 14.

If desired, the stack of discs described may be supplemented by at least one bridging or equalizing disc such as 52 (FIG. 14) formed with grooves 53 serving to interconnect the inlet apertures such as 45 formed in the distributor discs 44 between each pair of the latter discs.

A device comprising the stacked discs 37 and 38 and provided with injection ducts for more than one fluid, as diagrammatically shown in FIG. 10, may include any desired number of connections and disc-like strips, depending on the number and nature character of the fluids to be mixed.

A suitable pressure unit such as a metering pump serves to inject the fluids to be mixed into the unit of the invention under a suitably high pressure, of say 100 kg./sq. cm. or more, into the connections 45. The resulting body of fluid is collected in a single common manifold duct 54 (FIG. 16) extending axially of the unit. In some cases it may be desirable to preheat the fluids to be treated prior to injection thereof so as to provide a range of viscosity values consistent with the operating range of the unit. The pre-heating may be effected by means of electric heater elements positioned in the injection conduits.

Each fluid is subjected to the pulsing action resulting from its circulation through the circuitous path defined by the rosette cutouts in the stacked discs. As a result of this pulsing effect the fluid is subdivided into a fine dispersion of minute droplets. Moreover, the rotational motion and, in case of the alternately inverted strip relationship previously described is used, the flow reversals imposed upon the fluid result in an extremely energetic mixing of the droplets. Any repulsive forces, e.g. electrostatic forces, that may be present between the particles, is overcome by the violent agitation imposed, so that a perfectly intimate and uniform mixture of the various fluids is obtained.

The active and insert discs are desirably made out of the materials previously mentioned in connection with the strip-like laminae shown in FIGS. 6 and 8.

The distributor discs are preferably made of stainless steel, and the bridging discs 52 and flanges 46 may also be made of this same material.

The distributor discs 44 are preferably considerably greater in thickness than are either the active or the insert discs. Thus, they may have a thickness three times the diameter of the inlet apertures 45.

In such a mxing unit, a fluid mixing operation will be completed in a very short time. The fluids may be injected continuously by way of the pressure discharge means and the resulting mix flows out continuously from the apparatus of the invention, a distinct advantage in many practical cases.

It will be seen from the foregoing description and accompanying drawings that the invention has thus provided improved vibration generating means in which various advantageous features are present, the chief ones of which may be listed as follows: increased simplicity of manufacture; substantial reduction in objectionable parasitic vibrations; high accuracy in the vibrational frequencies obtained, due in particular to the machining operations involved; the possibility of conveniently developing high vibrational energies since the useful volume of the generator can easily be increased without any corresponding increase in the complication of the generator; high versatility and ready adaptability of the generator to a wide variety of practical applications as by modifying the shape and dimensions of the laminae and of the cutouts formed therein; the high efficiency of such generators for various industrial processes such as de-greasing wires and mixing fluids having widely different densities; ready servicing of the generators in connection with the cleaning and dismantling thereof it being noted that in many cases satisfactory cleaning can be performed simply by reversing the direction of fluid flow.

As already indicated the invention is by no means limited to the particular forms of embodiment of the components thereof, and/or to the particular uses and applications, that have been explicity mentioned and illustrated. From among the various conceivable modifications and variations lying within the scope of the invention, particular mention may be made of the following:

The internal cutouts in the laminae or strips may be made to contain cores, baffles or the like, as for preventing the formation of undesirable secondary vortices; such cores may, if desired, be carried by the insert strips.

In some modifications, electric heating elements, e.g. resistors, may be provided in the internal cutouts of the laminae or the cavities defined in the stacked laminae.

What I claim is:

1. In a whistle type vibration generator, a stack of laminae, cutout means formed in the laminae and each defining a separate circuitous fluid flowpath intersecting itself at least at one point to generate vibration in said fluid in the plane of the lamina, means forming an outlet duct communicating with all of said flowpaths, passage means for delivering pressure fluid to all said cutout means in a direction generally normal to the planes of the laminae for substantially concurrent circulation over said separate flowpaths, and separator means between the laminae for substantially preventing intermingling of fluid circulating over the flowpaths in adjacent laminae, whereby separately to excite vibrations in the individual laminae of the stack.

2. In a vibration generator, a stack of laminae, cutout means in the laminae defining separate circuitous flowpaths each of said flow-paths intersecting itself at least at one point to generate vibration in a circulating fluid in the planes of the laminae, means forming an outlet duct communicating with all of said flowpaths, passage means for delivering pressure fluid to all said cutout means for substantially concurrent circulation over said flowpaths, and separator means between the laminae for substantially preventing intermingling of fluid circulating over the flowpaths in adjacent laminae, whereby separately to excite vibrations in the individual laminae of the stack.

3. In a vibration generator, a stack of laminae, cutout means in certain of said laminae defining circuitous flowpaths each of said flow-paths intersecting itself at least at one point to generate vibration in a circulating fluid in the planes of said laminae in a clockwise direction as seen from one end of said stack, cutout means in other of said laminae defining circuitous flowpaths for fluid in the planes of said other laminae in a counterclockwise direction as seen from said one end of the stack, means forming an outlet duct communicating with all of said flowpaths, passage means for delivering pressure fluid to all said cutout means for concurrent vibration-generating circulation over said flowpaths, and separator means between the laminae for substantially preventing intermingling of fluid circulating over the flowpaths in adjacent laminae.

4. In a vibration generator, a stack of laminae, cutout means in one alternate set of said laminae defining circuitous flowpaths each of said flow-paths intersecting itself at least at one point to generate vibration in a circulating fluid in the plane of the laminae in a clockwise direction as seen from one end of said stack, cutout means in the remaining set of alternate laminae defining other circuitous flowpaths each of said other flow-paths intersecting itself at least at one point to generate vibration in a circulating fluid in the planes of the laminae in a counterclockwise direction as seen from said one end of the stack, means forming an outlet duct communicating with all of said flowpaths, means for delivering pressure fluid to all said cutout means for concurrent vibration-generating circulation over said respective flowpaths, and means preventing intermingling of fluid circulating over the flowpaths of adjacent laminae.

5. In a vibration generator, a stack of laminae, cutout means in the laminae each defining a circuitous fluid flowpath cavity portion in the plane of the laminae and including a fluid inlet aperture and a fluid outlet aperture into and out of said flow-path cavity, said inlet and outlet apertures in the respective laminae arranged in respectively registering relation said registering inlet and outlet apertures defining inlet and outlet ducts directed normal to the planes of the laminae, separator means between the laminae for isolating said flowpath cavity portions of adjacent laminae from one another, and means for delivering pressure fluid into said inlet duct for substantially concurrent vibration-generating circulation over said separate flowpaths and out through said outlet duct, each of said flow-paths intersecting itself at least at one point to generate vibration in said circuitous fluid whereby separately to excite vibrations in the individual laminae.

6. A vibration generator as claimed in claim 5, wherein each cutout means comprises a plurality of angularly equispaced inlet apertures, a plurality of similar circuitous flowpaths portions respectively connected with said inlet apertures and a common centrally disposed outlet aperture connected with all said flowpath portions whereby pressure fluid from said inlet apertures will flow in a common angular direction over all said circuitous flowpaths to generate vibrations thereat and will then flow out said common outlet aperture.

7. A vibration generator as claimed in claim 6, wherein said plurality is four.

8. A vibration generator comprising a stack of recessed laminate, the recesses in the respective laminae each of said recesses including an inlet aperture, an outlet aperture, and a looped flowpath interconnecting said inlet and outlet apertures in the plane of each lamina, said flow-path intersecting itself at least at one point to generate vibration in a circulating fluid, the inlet apertures in the stacked laminae registering to define at least one fluid inlet duct through the stack, the outlet apertures in the laminae registering to define at least one fluid outlet duct through the stack, separator means between the adjacent laminae to isolate said looped flowpaths from one another without interrupting said ducts each of said flow-paths intersecting itself at least at one point, and means for delivering fluid at high velocity at least one point into said inlet duct for simultaneously flowing through all said isolated flowpaths and separately exciting vibrations in the respective laminae by pulsation in said fluid generated at the intersection points of said flowpaths.

9. The generator claimed in claim 8, wherein said recesses are formed to direct fluid in reverse directions around the flowpaths in at least some of said laminae as compared to the flowpaths in other of said laminae.

10. The generator claimed in claim 8, which comprises a single stack of recessed laminae.

11. The generator claimed in claim 8, which comprises a single stack of disc-like recessed laminae.

12. The generator claimed in claim 8, which comprises a plurality of stacks of laminae and means for delivering said fluid into the inlet ducts through all said stacks simultaneously.

13. The generator claimed in claim 8, which comprises a plurality of similar stacks of laminae disposed in radial relationship about a common axis, and means for delivering said fluid into the inlet ducts through all said stacks simultaneously.

14. A vibration generator as claimed in claim 8 for use in cleaning an elongated wire-like element, wherein said fluid is a cleaning fluid and means are provided for feeding said element through at least one of said ducts in said stack.

15. The vibration generator claimed in claim 8, for use in mixing a plurality of fluids, which comprises means for introducing said fluids at respective points into said inlet duct.

16. In a whistle type vibration generator, a stack of laminae, cutout means in the laminae defining separate circuitous flowpaths in the planes of the laminae, means forming an outlet duct communicating with all of said flowpaths, passage means for delivering fluid under pressure to all said cutouts for substantially concurrent circulation over said flowpaths each of said flowpaths intersecting itself at least at one point, and separator means between at least some of said laminae for substantially preventing intermingling of fluid circulating of the flowpaths of the laminae on opposite sides of the separator means, whereby separately to excite vibrations in different laminae of the stack.

References Cited in the file of this patent

UNITED STATES PATENTS

| | | |
|---|---|---|
| 2,532,229 | Horsley | Nov. 28, 1950 |
| 2,779,695 | Brown | Jan. 29, 1957 |
| 2,815,535 | Bodine | Dec. 10, 1957 |
| 2,834,943 | Grisdale | May 13, 1958 |
| 2,842,067 | Stevens | July 8, 1958 |

FOREIGN PATENTS

| | | |
|---|---|---|
| 1,131,551 | France | Oct. 22, 1956 |

UNITED STATES PATENT OFFICE
CERTIFICATE OF CORRECTION

Patent No. 3,071,145                                                  January 1, 1963

Jean Maurice Blanchard

It is hereby certified that error appears in the above numbered patent requiring correction and that the said Letters Patent should read as corrected below.

Column 10, lines 34 and 35, strike out "recessed"; line 35, for "laminate" read -- laminae --; same line 35, for ", the" read -- having --; same line 35, after "laminae" insert a comma.

Signed and sealed this 9th day of July 1963.

(SEAL)
Attest:

ERNEST W. SWIDER                                                DAVID L. LADD
Attesting Officer                                                  Commissioner of Patents